Feb. 3, 1925.

R. M. FINN 1,524,858

METHOD FOR GALVANIZING CYLINDRICAL BODIES

Filed Nov. 15, 1923

INVENTOR.
Richard M. Finn
BY
Miller, Henry & Boyken
ATTORNEY.

Patented Feb. 3, 1925.

1,524,858

UNITED STATES PATENT OFFICE.

RICHARD M. FINN, OF MILL VALLEY, CALIFORNIA, ASSIGNOR TO JOHN FINN METAL WORKS, OF SAN FRANCISCO, CALIFORNIA, A CORPORATION OF CALIFORNIA.

METHOD FOR GALVANIZING CYLINDRICAL BODIES.

Application filed November 15, 1923. Serial No. 674,850.

*To all whom it may concern:*

Be it known that I, RICHARD M. FINN, a citizen of the United States, and a resident of Mill Valley, Marin County, State of California, have invented new and useful Improvements in Methods for Galvanizing Cylindrical Bodies, of which the following is a specification.

My invention is particularly applicable to the securing of a smooth homogenous galvanized coating of even thickness on cylindrical or substantially cylindrical articles.

My invention is applicable to secure a perfect galvanized surface, on cylindrical bodies and particularly on the screw threaded or machined surfaces of cylindrical bodies as bolts, rods, pipes and the like after they have been dipped in the galvanizing bath.

These objects I accomplish by spinning the cylindrical body, while the coating is still in the molten state, about its own axis as a center of rotation, whereby the centrifugal force generated in the coating material on the periphery overcomes the cohesive forces within the material, and causes any superfluous material to be thrown off, thus leaving an even skin thickness of the coating material adhering to the cylindrical surface.

By my invention I am able to remove the superfluous galvanizing material from the surface of cylindrical objects as bolts, rods, and the like, leaving the adhering galvanizing smooth and of equal thickness with the screw threads or other interstices thoroughly cleaned of superfluous coating, whereby the surface contour of the original article is retained with a great degree of accuracy.

Figure 1:
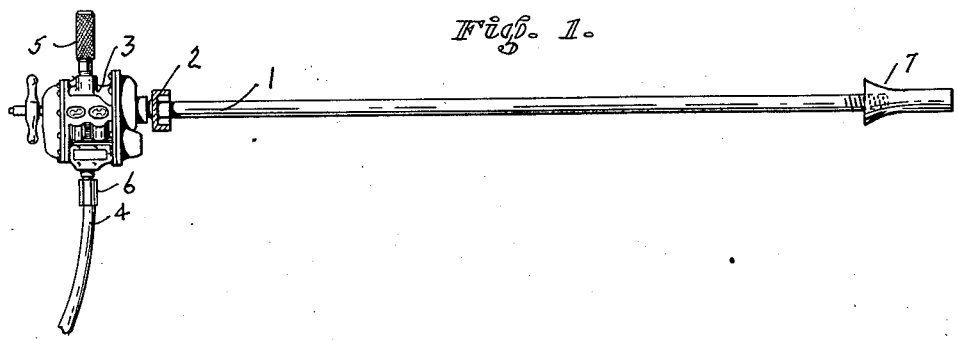
Figure 2:
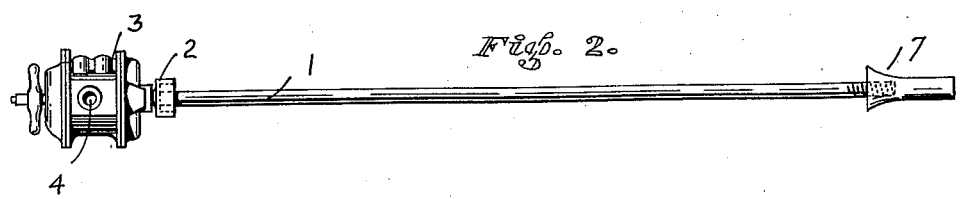

By referring to the accompanying drawing, my invention will be understood. In the drawing, Figure 1 is a side view of one form of apparatus for practising my invention. Figure 2 is a plan view of the apparatus of Figure 1.

Throughout the figures similar numerals refer to identical parts.

The numeral 1 indicates a hot cylindrical body which has been galvanized in the conventional way, and on the surface of which the galvanizing material is still in the plastic or molten state. A rotating apparatus comprising a rotating head 2, and an encased motor 3 is energized as by compressed air through the hose, 4. At 7 is a guide of cone shape and into which one end of the body 1 rests and the head 2 grips the other end of the body in any conventional way and forces its rotation.

The handles 5, 6 may be grasped to actuate the compressed air motor and rotate the body 1 thereby causing the excess material to be thrown off by centrifugal force as the body rotates about its axis.

Other means may be employed to rotate the bodies on their axes, thereby effecting the centrifugal separation of the fluid or plastic surface, it being noted that when so whirled the centrifugal force of separation is constant throughout the period of the said treatment, and over the entire cylindrical surface.

I claim:

1. The method of removing superfluous coating material from a substantially cylindrical object which consists in spinning said object between end supports on its cylindrical axis while said material is still plastic.

2. The method of galvanizing a substantially cylindrical body which consists in dipping said body in a hot galvanizing bath and thereafter while hot and before the coating has hardened spinning said body on its cylindrical axis between end supports whereby the superfluous coating is thrown off by centrifugal force.

RICHARD M. FINN.